United States Patent
Miyasaka et al.

(10) Patent No.: US 11,489,990 B2
(45) Date of Patent: Nov. 1, 2022

(54) OPTICAL ELEMENT, OPTICAL SYSTEM, AND IMAGING APPARATUS

(71) Applicant: AGC Inc., Tokyo (JP)

(72) Inventors: Koji Miyasaka, Tokyo (JP); Masatoshi Oyama, Fukuoka (JP)

(73) Assignee: AGC Inc., Tokyo (JP)

( * ) Notice: Subject to any disclaimer, the term of this patent is extended or adjusted under 35 U.S.C. 154(b) by 87 days.

(21) Appl. No.: 17/026,367

(22) Filed: Sep. 21, 2020

(65) Prior Publication Data

US 2021/0006695 A1 Jan. 7, 2021

Related U.S. Application Data

(63) Continuation of application No. PCT/JP2019/014385, filed on Mar. 29, 2019.

(30) Foreign Application Priority Data

Mar. 30, 2018 (JP) .............................. JP2018-067047

(51) Int. Cl.
*H04N 5/225* (2006.01)
*G02B 7/02* (2021.01)
*G02B 3/04* (2006.01)
*G02B 1/04* (2006.01)

(52) U.S. Cl.
CPC .............. *H04N 5/2254* (2013.01); *G02B 3/04* (2013.01); *G02B 7/021* (2013.01); *G02B 1/041* (2013.01)

(58) Field of Classification Search
CPC ........ H04N 5/2254; G02B 3/04; G02B 7/021; G02B 1/041; G02B 7/022
See application file for complete search history.

(56) References Cited

U.S. PATENT DOCUMENTS

| 2005/0243429 A1 | 11/2005 | Shulepova et al. |
| 2008/0151362 A1 | 6/2008 | Ueta et al. |
| 2010/0214677 A1* | 8/2010 | Monti ............... G02B 7/021 |
| | | 359/820 |

(Continued)

FOREIGN PATENT DOCUMENTS

| CN | 1668941 A | 5/2005 |
| CN | 102135633 A | 7/2011 |

(Continued)

OTHER PUBLICATIONS

International Search Report dated Jun. 25, 2019 in PCT/JP2019/014385 filed on Mar. 29, 2019, 1 page.

*Primary Examiner* — Abdelaaziz Tissire
(74) *Attorney, Agent, or Firm* — Oblon, McClelland, Maier & Neustadt, L.L.P.

(57) ABSTRACT

The present invention relates to an optical element including an optical surface, a tapered part located on an outer peripheral side of the optical surface and having a normal line of which a direction heading to an outside of the optical element from an inside thereof, faces an optical axis side, and a side surface part located on an outer peripheral side of the tapered part, in which when a distance in a straight line vertical to an optical axis of from an end point on the optical axis side of the tapered part to the side surface part is denoted by A and a height of the tapered part based on the straight line is defined by B, in a cross section including the optical axis and passing through the tapered part, B/A is larger than 0.2.

20 Claims, 8 Drawing Sheets

(56) References Cited

U.S. PATENT DOCUMENTS

2013/0271858 A1* 10/2013 Koh ..................... G02B 7/021
                                                    359/819
2014/0319707 A1   10/2014 Watanabe et al.
2015/0301303 A1* 10/2015 Kim ..................... B32B 37/18
                                                    29/428

FOREIGN PATENT DOCUMENTS

| CN | 104010789 A    | 8/2014  |
|----|----------------|---------|
| JP | 2004-309567 A  | 11/2004 |
| JP | 4874084 B2     | 2/2012  |
| JP | 2013-01 4466 A | 1/2013  |
| JP | 5274881 B2     | 8/2013  |
| JP | 2014-202894 A  | 10/2014 |
| JP | 6280337 B2     | 2/2018  |

* cited by examiner

OPTICAL ELEMENT, OPTICAL SYSTEM, AND IMAGING APPARATUS

This application is a continuation of prior International Application No. PCT/JP2019/014385, filed on Mar. 29, 2019 which is based upon and claims the benefit of priority from Japanese Patent Application No. 2018-067047, filed on Mar. 30, 2018, the disclosure of which is incorporated herein by reference.

TECHNICAL FIELD

The present invention relates to an optical element, an optical system, and an imaging apparatus.

BACKGROUND ART

Lens unit used in a camera for mobile phones (including smart phones) or in an in-vehicle camera is generally formed by laminating a plurality of lens elements in an optical axis direction in a lens barrel. Lens unit must be fabricated such that an optical axis of each lens element is not eccentric from the central axis of the lens barrel (i.e., such that the optical axis does not deviate).

Patent Literature 1 describes a lens unit formed by fitting together a flange part provided in a lens element and a flange part provided on a lens barrel side in order that the optical axis of the lens element is not eccentric. Specifically, a flange part having a tapered part is provided on a peripheral part of the lens element. Furthermore, a flange part having a tapered part that is to fit into the flange part of the lens element is provided on the lens barrel side. Fitting both flange parts to each other such that both tapered parts come into contact with each other, makes the optical axis of the lens element match the optical axis of the lens barrel.

Patent Literature 2 describes an optical lens having a flange part, in which an inclined part is provided between an effective area (optical surface) of a lens surface and the flange part in the outside of the effective area, and an inclined surface in the inclined part is utilized in alignment when producing. Adjusting a lens position depending on the contact state between a lens holding part and the inclined surface when producing an optical lens, makes the central axis of a lens forming mold match the optical axis of the lens.

Patent Literature 3 discloses an optical system in which a glass lens is superposed on another lens and those are stored in a lens barrel. The glass lens has an optical function part and a flange part (edge section), an inclined part is provided between the optical function part and the flange part in the periphery of the glass lens, and the tapered part in the inclined part is used in alignment when producing. Furthermore, it is considered that voids are prevented from occurring in a molding mold when forming a glass lens.

CITATION LIST

Patent Literature

Patent Literature 1: Japanese Patent No. 5274881
Patent Literature 2: Japanese Patent No. 4874084
Patent Literature 3: Japanese Patent No. 6280337

SUMMARY OF INVENTION

Technical Problem

The optical lens described in Patent Literature 2 has a problem that in the case where the material is a glass, it is difficult to obtain sufficient shape accuracy when forming a tapered part. This is because, as compared with a resin, a viscosity of a glass when forming is high, and a gas trap (air trap) is easy to occur.

A tapered part for alignment is formed in the glass lens described in Patent Literature 3, but the tapered part is formed such that a normal line heading to the outside of the glass lens from the inside thereof faces a direction separating from an optical axis. However, a tapered part that a direction of a normal line heading to the outside from the inside faces an optical axis may be desired in some cases. It is not sure as to how a thickness of a flange part and an angle of the tapered part, described in Patent Literature 3 are applicable when forming the tapered part that the direction of a normal line heading to the outside from the inside faces an optical axis.

The present invention has an object to provide an optical element that can reduce a trace of an air trap when producing and can prevent eccentricity of an optical axis with high accuracy, and to provide an optical system having the optical element and an imaging apparatus having the optical element.

Solution to Problem

The optical element according to the present invention includes an optical surface, a tapered part located on an outer peripheral side of the optical surface and having a normal line of which a direction heading to an outside of the optical element from an inside thereof, faces an optical axis side, and a side surface part located on an outer peripheral side of the tapered part, in which when a distance in a straight line vertical to an optical axis of from an end point on the optical axis side of the tapered part to the side surface part is denoted by A and a height of the tapered part based on the straight line is defined by B, in a cross section including the optical axis and passing through the tapered part, B/A is larger than 0.2.

The optical system according to the present invention includes the optical element.

The imaging apparatus according to the present invention includes the optical element.

Advantageous Effects of Invention

According to the present invention, an optical element that can reduce a trace of air trap when producing and can prevent eccentricity of an optical axis with high accuracy is provided.

DESCRIPTION OF EMBODIMENTS

The embodiments of the present invention are described below by reference to the drawings.

Embodiment 1

Figure 1:
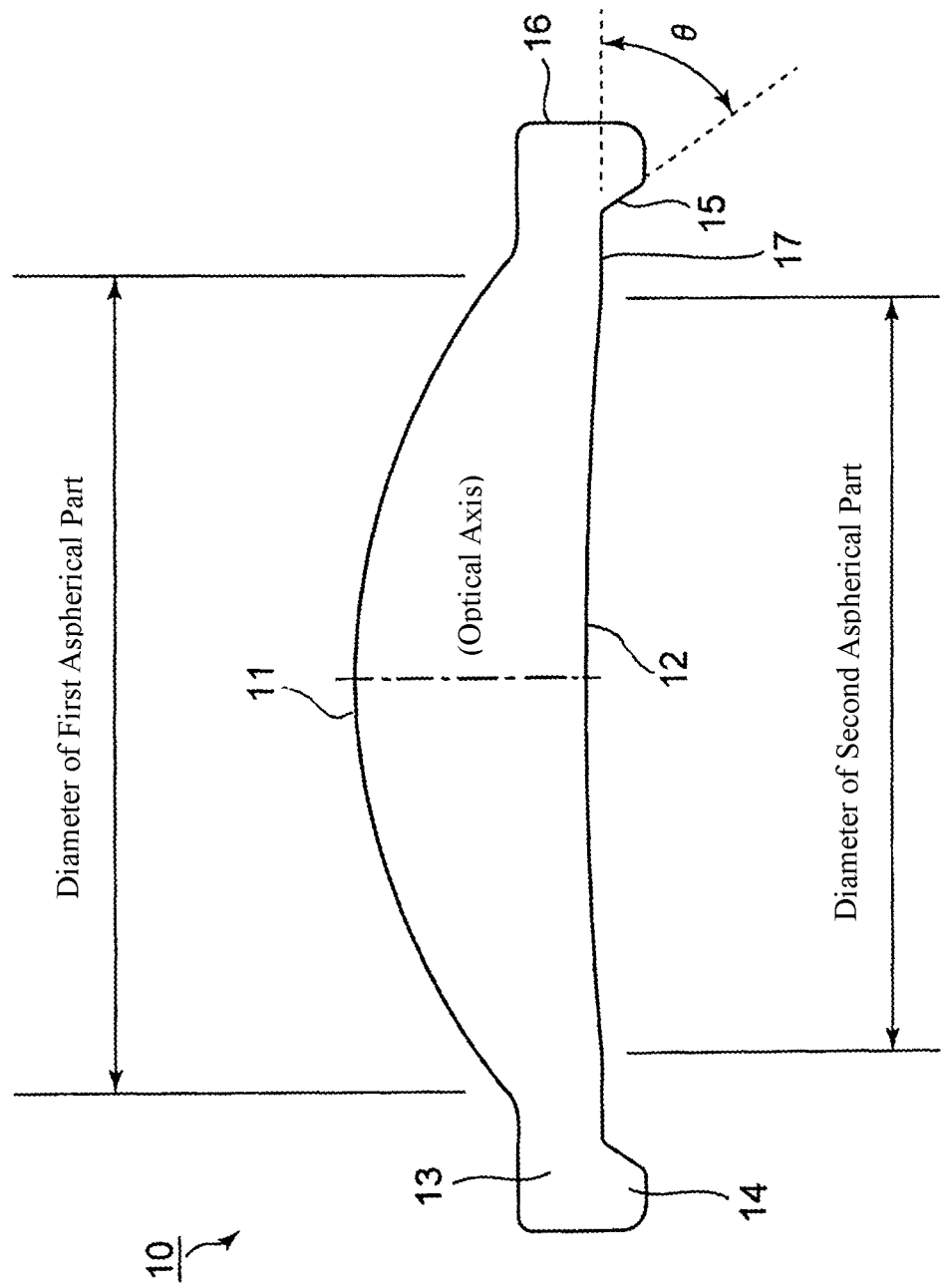
FIG. 1 is a cross-sectional view illustrating an optical element according to one embodiment of the present invention.
Figure 2:
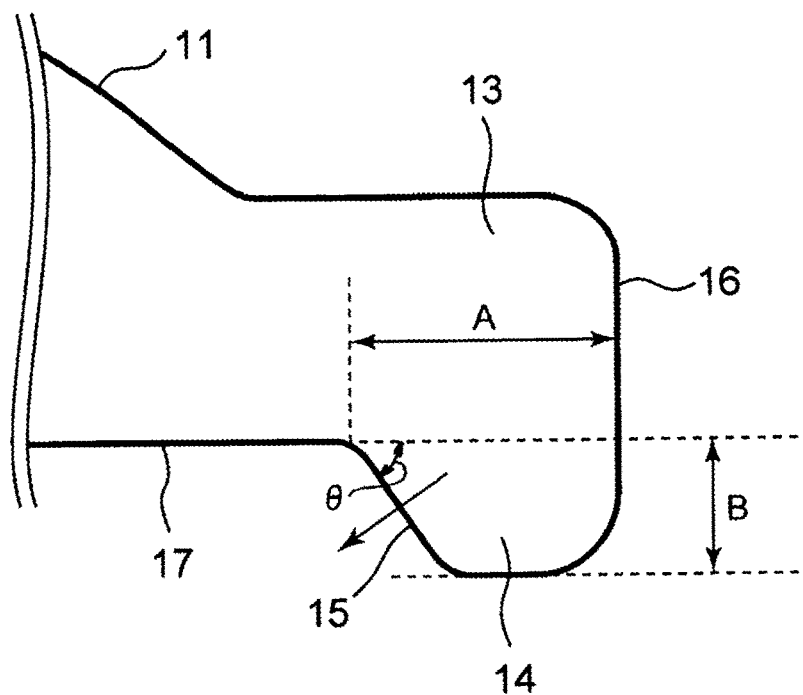
FIG. 2 is an enlarged cross-sectional view illustrating a flange part of the optical element in FIG. 1.

FIG. 1 is a cross-sectional view illustrating an optical element according to one embodiment of the present invention. FIG. 2 is an enlarged cross-sectional view illustrating a flange part of the optical element in FIG. 1. A glass lens 10 exemplified in FIGS. 1 and 2 is one example of the optical element.

The glass lens 10 has a convex first aspherical part 11 and a concave second aspherical part 12 facing the first aspherical part 11, in the central part. In FIG. 1, the optical axis of the glass lens 10 is shown by a dashed-dotted line. The glass lens 10 having a curvature radius of the first aspherical part 11 in the optical axis smaller than a curvature radius of the second aspherical part 12 in the optical axis is exemplified in FIG. 1. The glass lens 10 exemplified in FIG. 1 is a meniscus type convex lens.

Hereinafter, the side of the first aspherical part 11 is sometimes called an upper part, and the side of the second aspherical part 12 is sometimes called a lower part. Furthermore, the first aspherical part 11 and the second aspherical part 12 are defined as optical surfaces.

The glass lens 10 has a flange part 13 on the outside of the central part. Furthermore, the glass lens 10 has a side surface part 16 (lateral part of periphery of the flange part 13).

The flange part 13 has a convex part 14 projecting downward in the side surface part 16. Of the convex part 14, a tapered part 15 is formed on the second aspherical part 12 side. The tapered part 15 is formed as an inner peripheral part (inner wall) of the convex part 14 such that a direction of a normal line (see an arrow in FIG. 2) of the tapered part 15, heading to the outside of the flange part 13 from the inside faces the optical axis. An angle formed between the tapered part 15 and a plane vertical to the optical axis is denoted by θ. Furthermore, the portion between the second aspherical part 12 and the tapered part 15, in the flange part 13 is called a bottom 17. The bottom 17 may be inclined from a horizontal axis (axis perpendicular to the optical axis) in a cross-sectional view. The angle θ of the tapered part 15 may be 45° or more and 90° or less (or less than 90°). Furthermore, an angle formed between the bottom 17 and the horizontal axis (axis perpendicular to the optical axis) in a cross-sectional view may be 0° or more and 30° or less.

The glass lens 10 having the tapered part 15 formed on the lower part is illustrated in FIGS. 1 and 2, but the glass lens 10 may have a tapered part on the upper part. Furthermore, the tapered part may be formed on both the lower part and the upper part.

As illustrated in FIG. 2, a distance in a straight line in a horizontal direction between the end point on the optical axis side of the tapered part 15 and the side surface part 16 is denoted by A in a cross section including the optical axis and passing through the tapered part. Furthermore, the height of the convex part 14 (corresponding to a height of the tapered part 15) is denoted by B.

Figure 3:
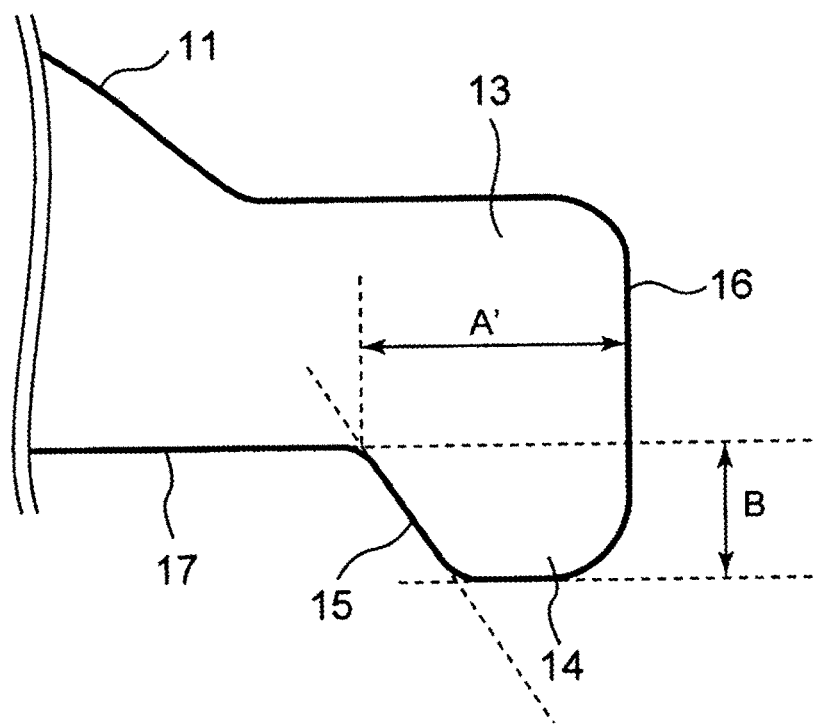
FIG. 3 is an enlarged cross-sectional view of the flange part.

In the case of forming the glass lens 10 by a glass molding or the like, there is a possibility that the bottom 17 and the tapered part 15 shrink so as to form a curved surface having a certain curvature radius due to the deterioration of a mold or due to the shrinkage generated in the course of formation. Considering such a possibility, A may be defined as a distance in a straight line in a horizontal direction between a reference point and the side surface part 16 when an intersection point between an extension line of the bottom 17 and an extension line of the tapered part 15 is used as the reference point, in the cross section including the optical axis and passing through the tapered part as illustrated in FIG. 3. In FIG. 3, the distance is indicated by A'.

The relationship between the distance A and the height B preferably satisfies the following relationship from a view point of production of the glass lens 10, described hereinafter. Specifically, in the case where the following relationship is satisfied, the occurrence of air trap is reduced when forming the glass lens 10 with a glass molding or the like.

Specifically, the relationship c is preferably $B/A > 1/5$, more preferably $B/A > 1/4$ and still more preferably $B/A > 1/2$.

On the other hand, in the case where the value of the height B is too large, a glass material more likely bites into a mold in decreasing the temperature of the glass material from high temperature to low temperature when forming the glass lens 10. Therefore, the relationship between A and B is preferably $B/A < 10$ and more preferably $B/A < 5$. A specific numerical value of B is preferably 500 μm or less, more preferably 250 μm or less and still more preferably 125 μm or less, in order to prevent breakage of a glass when forming. A specific numerical value of A is set so as to satisfy the ratio of B/A.

Various glasses can be used as a glass material formed into the glass lens 10. A glass material having small liner expansion coefficient is preferably selected in order to prevent the biting of the glass material into the mold. For example, the glass material has a linear expansion coefficient of preferably $10 \times 10^{-6}$/° C. or less, more preferably $9 \times 10^{-6}$/° C. or less and still more preferably $8 \times 10^{-6}$/° C. or less.

The tapered part 15 is preferably formed in a range of 360° centering around the optical axis of the glass lens 10, but there is a possibility that the tapered part lacks a part thereof due to the production variation or the occurrence of air trap. In such a case, the tapered part 15 is preferably formed in a range of 270° or more.

In the cross section including the optical axis and passing through the tapered part, the length of the tapered part 15 is preferably 30 μm or more. In the case where the length is 30 μm or more, alignment with another lens can be performed with good accuracy. From the same standpoint, the length of the bottom 17 in cross-sectional view is more preferably 50 μm or more.

In the present embodiment, the optical element is the glass lens 10. However, the optical element is not limited to this, and may be a lens formed of a light-transmitting material, for example, a light-transmitting resin. Furthermore, the shape of the lower part of the glass lens 10 is aspherical, but may be spherical and may be flat.

The tapered part 15 is provided in the flange part 13. In the case of, however, an optical element having no flange part 13, the tapered part 15 may be provided in the bottom 17 of the present embodiment. Regardless of the presence or absence of the flange part 13, the tapered part 15 is located on the outer peripheral side of the optical surface (second aspherical surface), and the portion formed by the optical surface (specifically, the second aspherical part 12), the bottom 17 and the tapered part 15 may have a concave shape.

The outer diameter of the glass lens 10 is preferably small in order that the tapered part 15 is surely formed. For example, the outer diameter is preferably 10 mm or less and more preferably 6 mm or less. On the other hand, the outer diameter of the glass lens 10 is preferably 1 mm or more.

Figure 4:
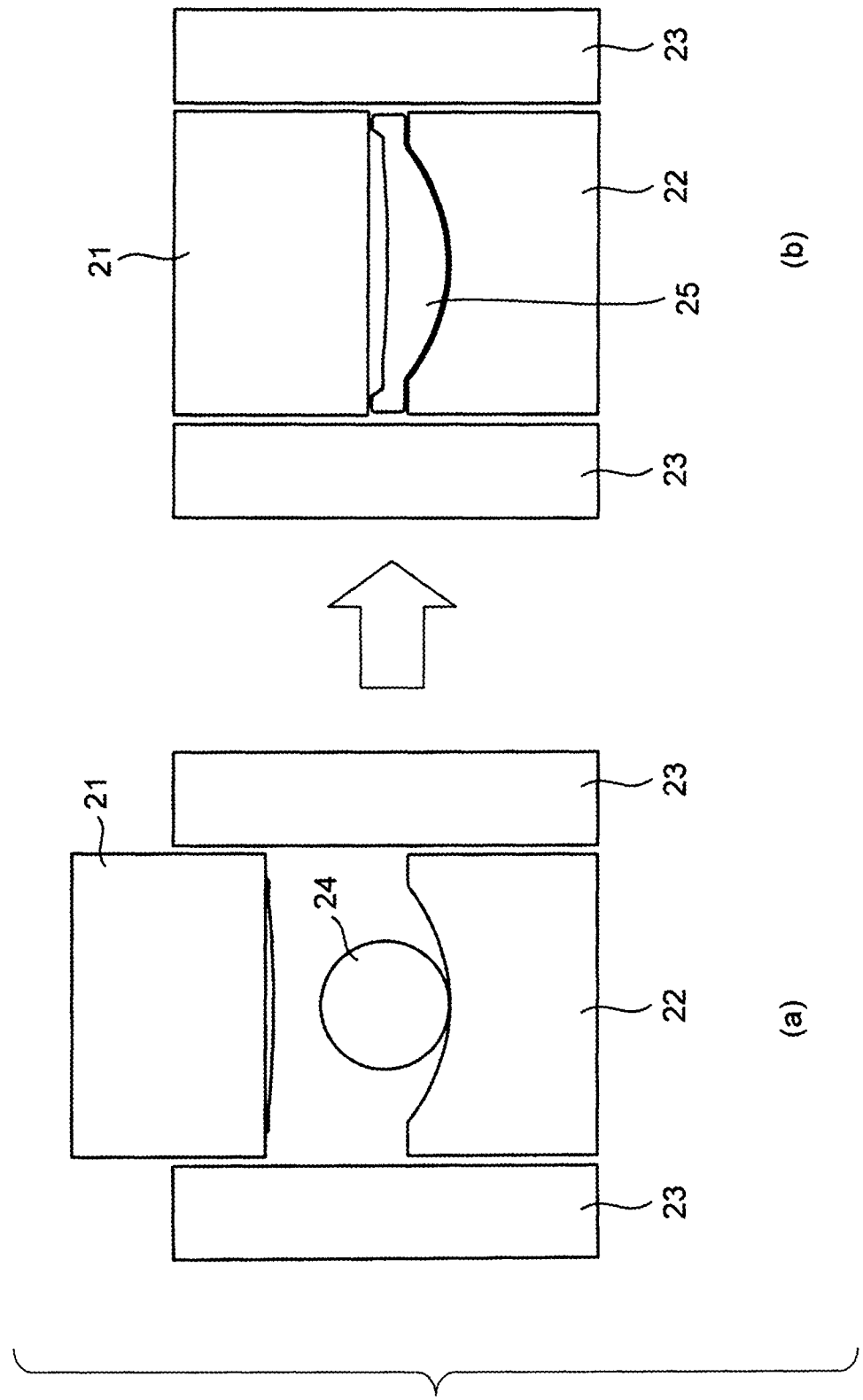
FIG. 4 is an explanatory view schematically illustrating a method of formation of a glass lens.

A method for forming the glass lens 10 is described below. FIG. 4 is an explanatory view schematically illustrating a method for forming the glass lens 10. The glass lens 10 is formed by a glass molding.

As illustrated in (a) of FIG. 4, a glass material (preform) 24 is placed on a second mold 22 regulating the first aspherical part 11. The preform 24 is heated at a temperature higher than a glass transition point, and the preform 24 is pressurized by a first mold 21 regulating the second aspherical part 12. As a result, a glass member 25 is obtained as illustrated in (b) of FIG. 4. The glass member 25 thus formed corresponds to the glass lens 10. The outer diameter of the glass member 25 is regulated by a cylindrical third mold 23.

Figure 5:
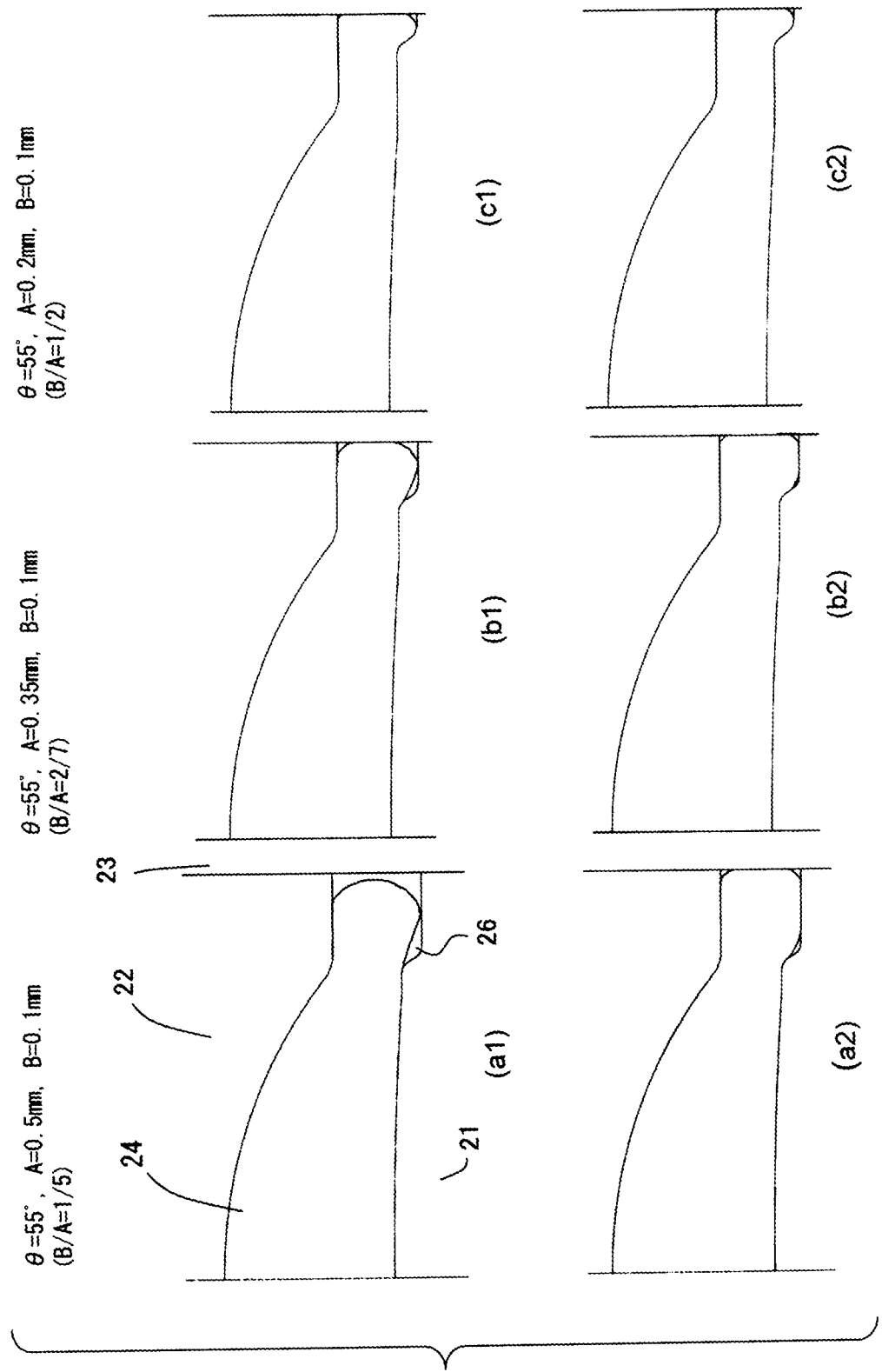
FIG. 5 includes explanatory views showing simulation results of spread of a glass during formation by a finite element method.
Figure 6:
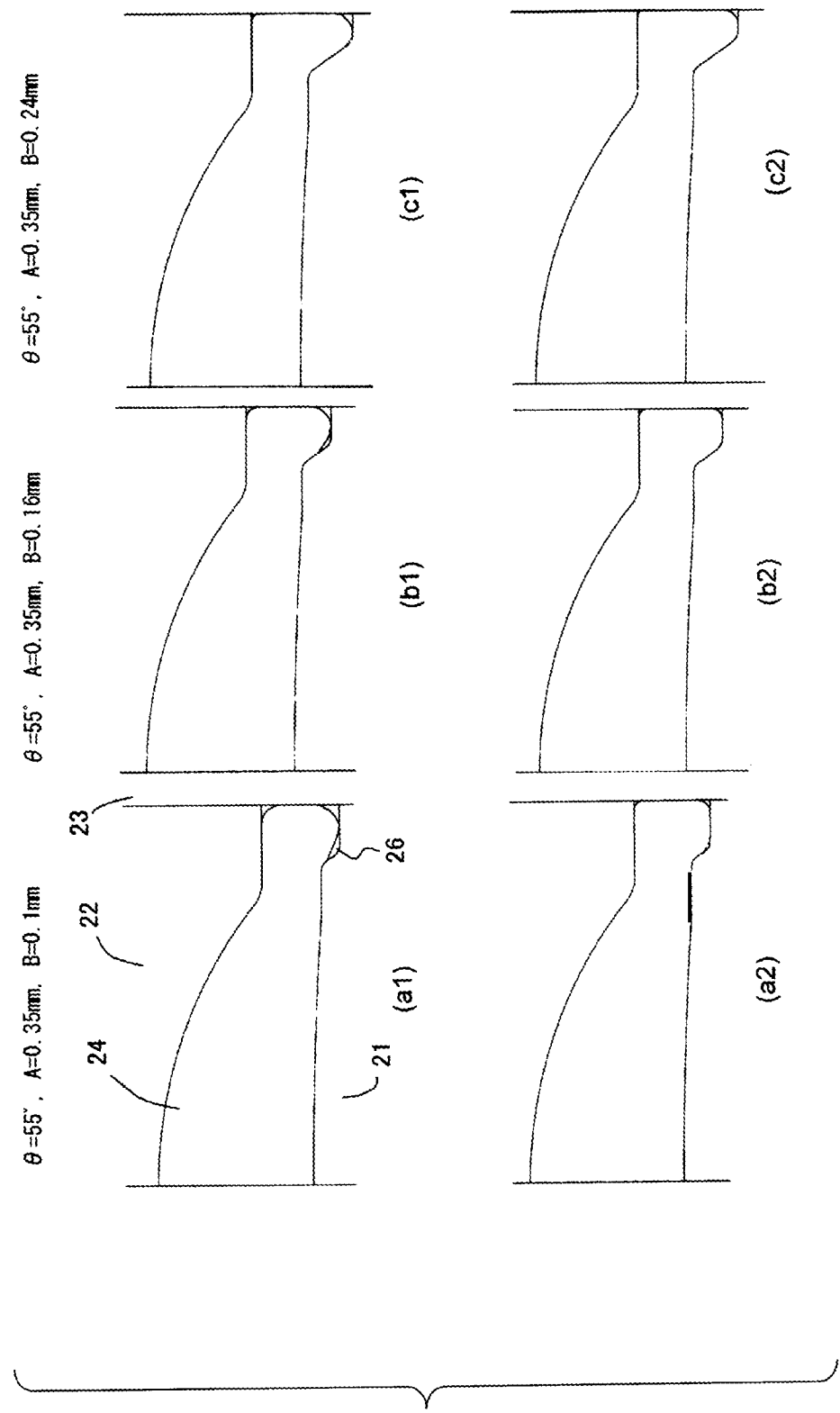
FIG. 6 includes explanatory views showing simulation results of spread of a glass during formation by a finite element method.

The simulation results of a spread of a glass during formation by a finite element method for the glass lens 10 having an outer diameter of 4 mm as an object are shown in FIGS. 5 and 6. Specifically, the states of the preform 24 during the formation of the glass lens 10 are illustrated.

Example 1 is illustrated in (a1) and (a2) of FIG. 5. Example 2 is illustrated in (b1) and (b2) of FIG. 5. Example 3 is illustrated in (c1) and (c2) of FIG. 5. Example 4 is illustrated in (a1) and (a2) of FIG. 6. Example 5 is illustrated in (b1) and (b2) of FIG. 6. Example 6 is illustrated in (c1) and (c2) of FIG. 6.

In Example 1, θ (see FIG. 1) was set 55°, the distance A (see FIG. 2) was set 0.5 mm and the height B (see FIG. 2) was set 0.1 mm. (a1) of FIG. 5 illustrates the state when the preform 24 came into contact with the bottom of the concave part (the portion for transferring the convex part 14 in the flange part 13) in the first mold 21. (a2) of FIG. 5 illustrates the state when the preform 24 was further fluidized.

In Example 2, θ was set 55°, the distance A was set 0.35 mm and the height B was set 0.1 mm. (b1) of FIG. 5 illustrates the state when the preform 24 came into contact with the bottom of the concave part in the first mold 21. (b2) of FIG. 5 illustrates the state when the preform 24 was further fluidized.

In Example 3, θ was set 55°, the distance A was set 0.2 mm and the height B was set 0.1 mm. (c1) of FIG. 5 illustrates the state when the preform 24 came into contact with the bottom of the concave part in the first mold 21. (c2) of FIG. 5 illustrates the state when the preform 24 was further fluidized.

As illustrated in (a1), (b1) and (c1) of FIG. 5, when the preform 24 came into contact with the bottom of the concave part in the first mold 21, an air trap 26 appears in the concave part in the first mold 21. The air trap 26 remarkably appears in the example illustrated in (a1) of FIG. 5, but is decreased as the value of B/A becomes large (see (b1) and (c1) of FIG. 5).

The examples when the value of B/A was increased as compared with the examples illustrated in FIG. 5 are illustrated in FIG. 6

Specifically, in Example 4, θ was set 55°, the distance A was set 0.35 mm and the height B was set 0.1 mm (note: same as in Example 2). (a1) of FIG. 6 illustrates the state when the preform 24 came into contact with the bottom of the concave part in the first mold 21. (a2) of FIG. 6 illustrates the state when the preform 24 was further fluidized.

In Example 5, θ was set 55°, the distance A was set 0.35 mm and the height B was set 0.16 mm. (b1) of FIG. 6 illustrates the state when the preform 24 came into contact with the bottom of the concave part in the first mold 21. (b2) of FIG. 6 illustrates the state when the preform 24 was further fluidized.

In Example 6, θ was set 55°, the distance A was set 0.35 mm and the height B was set 0.24 mm. (c1) of FIG. 6 illustrates the state when the preform 24 came into contact with the bottom of the concave part in the first mold 21. (c2) of FIG. 6 illustrates the state when the preform 24 was further fluidized.

Numerical values relating to Examples 1 to 6 are shown in the following table.

TABLE 1

| Example | B (mm) | A (mm) | B/A |
|---------|--------|--------|-------|
| 1 | 0.1 | 0.5 | 0.200 |
| 2 | 0.1 | 0.35 | 0.286 |
| 3 | 0.1 | 0.2 | 0.500 |
| 4 | 0.1 | 0.35 | 0.286 |
| 5 | 0.16 | 0.35 | 0.457 |
| 6 | 0.24 | 0.35 | 0.686 |

Comparing examples illustrated in FIG. 5 and examples illustrated in FIG. 6, it is found that the region of the air trap 26 is decreased as the value of B/A increases.

For example, the air trap 26 occurs in Examples 2 and 4, but the air trap 26 has an acceptable size. In Examples 3 and 5, the size of the air trap 26 is decreased. In Example 6, the occurrence of the air trap 26 is not almost recognized.

That the region of the air trap 26 decreases corresponds to that a trace of the air trap 26 decreases in a molded article (glass lens 10) and the shape of the concave part in the first mold 21 is accurately transferred to the preform 24. In other words, this leads to that the tapered part 15 can be formed with high accuracy.

The reason that the region of the air trap 26 is decreased as the value of B/A increases is described by reference to the explanatory view of FIG. 7.

Figure 7:
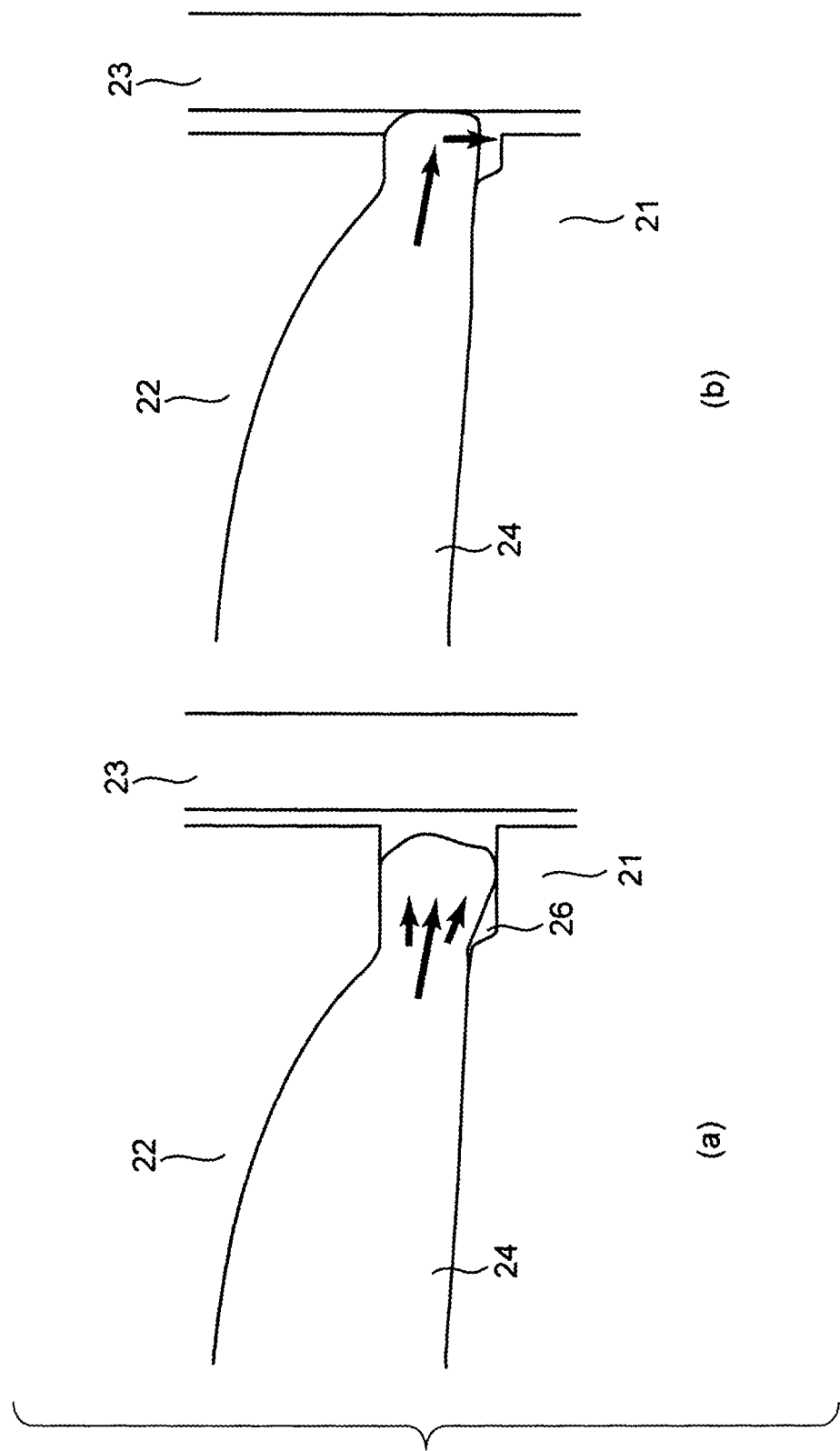
FIG. 7 includes explanatory views for explaining the reason that a region of an air trap is decreased as the value of B/A is large.

In the case where the value of B/A is small, the preform 24 pressurized comes into contact with the bottom of the concave part in the first mold 21 before contacting with an inner wall of the third mold 23, as illustrated in (a) of FIG. 7. In such a case, the air trap 26 occurs between the preform 24 and the bottom of the concave part in the first mold 21. As a result, the shape of the concave part in the first mold 21 is not accurately transferred to the preform 24. In other words, a convex pat 14 (see FIG. 1) in the flange part 13 of the glass lens 10 does not have a desired shape. In other words, the accuracy of the shape of the tapered part 15 is deteriorated.

In the case where the value of B/A is large, the preform 24 pressurized comes into contact with an inner wall of the third mold 23 before contacting with the bottom of the concave part in the first mold 21, as illustrated in (b) of FIG. 7. When the preform 24 is fluidized in such a state, the possibility that the preform 24 uniformly flows down toward the bottom of the concave part in the first mold 21 is increased. As a result, the possibility of the occurrence of the air trap 26 is decreased. Therefore, the convex part 14 (see FIG. 1) in the flange part 13 of the glass lens 10 has almost desirable shape. In other words, the tapered part 15 is formed with high accuracy.

A method for forming the glass lens 10 and a shape of molds used for the formation are again described below.

The portion in the first mold 21, forming the tapered part 15 in the convex part 14 of the flange part 13 is formed as an inclined part such that a direction of the normal line heading to the outside of the mold from the inside thereof faces so as to separate from the optical axis. In other words, the portion of the first mold 21 is formed such that the shape of the convex part 14 can be transferred on the preform 24. The portion of the first mold 21 is formed so as to satisfy B/A>0.2.

The tapered part 15 is formed with high transfer accuracy by using molds including the first mold 21 having the portion thus formed.

EXAMPLES

Figure 8:
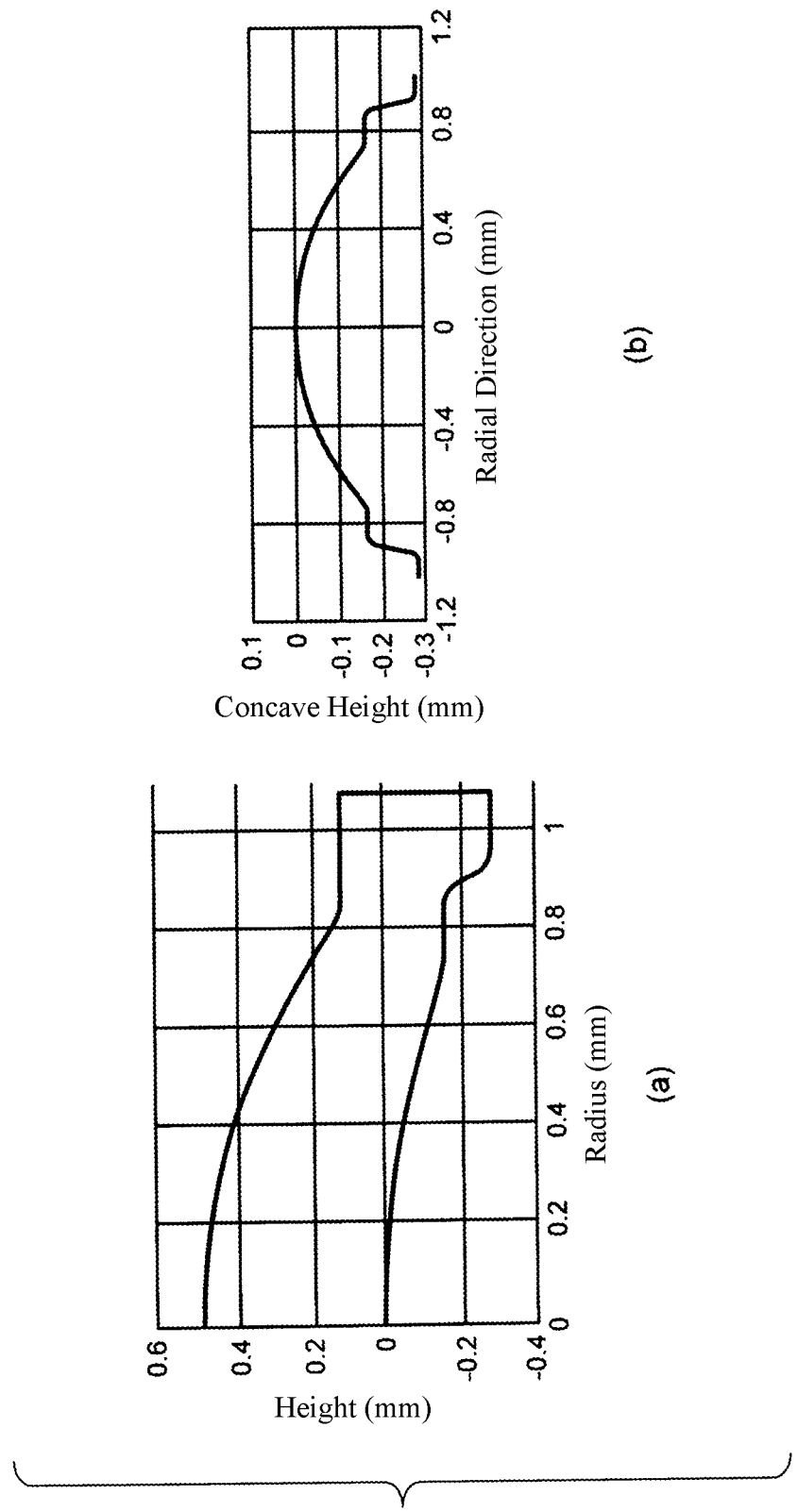
FIG. 8 is an explanatory view showing a shape of the glass lens of first example.

Specific one example of the glass lens 10 according to the first embodiment is described below. As shown in FIG. 8, the glass lens 10 in which the first aspherical part 11 is convex toward the upper part and the second aspherical part 12 is concave toward the lower part was used in the present example. The first aspherical part 11 is designated as a convex surface and the second aspherical part 12 is designated as a concave surface. Approximate curvature radius of the convex aspherical surface is 1.13 mm. Approximate curvature radius of the concave aspherical surface is 1.76 mm. A part of the shape of the glass lens 10 of the present example is shown in (a) of FIG. 8.

The shape shown in (a) of FIG. 8 was transferred to the preform 24 by a glass molding, as described above. The shape has θ=68.8° and B/A=0.52.

The shape of the glass lens 10 formed is shown in (b) of FIG. 8. As shown in (b) of FIG. 8, A=0.226 mm and B=0.117 mm. Furthermore, A'=0.187 mm. B/A=0.52 and B/A'=0.63. In other words, those satisfy the requirement of B/A>0.2.

Figure 9:
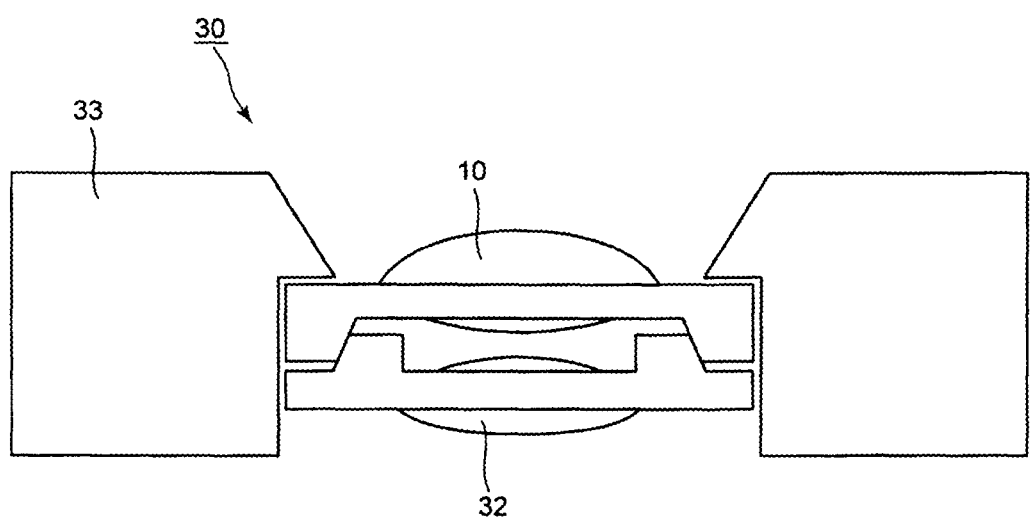
FIG. 9 is a cross-sectional view schematically illustrating one example of a lens unit.

FIG. 9 is a cross-sectional view schematically illustrating one example of a lens unit. A lens unit 30 illustrated in FIG. 9 has a structure including a lens barrel 33 having incorporated therein the glass lens 10 and another lens element 32. A biconvex glass lens 10 is exemplified in FIG. 9. The glass lens 10 and the lens element 32 are aligned such that the tapered part of the glass lens 10 comes into contact with the tapered part of the lens element 32.

As described above, because the tapered part of the glass les 10 is formed into a desired shape with good accuracy, the glass lens 10 and the lens element 32 are aligned with high accuracy. In other words, the glass lens 10 and the lens element 32 can be easily prevented from the occurrence of eccentricity of optical axes of the glass lens 10 and the lens element 32 in the lens unit 30.

In the lens unit 30 exemplified in FIG. 9, the glass lens 10 is combined with one other lens element 32. However, the glass lens 10 can be applied to the case of preparing a lens unit containing a combination of the glass lens 10 and a plurality of other lens elements.

The embodiments and examples of the optical element of the present invention are described above, but the optical elements of the above embodiments and examples can be applied to (e.g., incorporated in) various optical systems.

Examples of the optical system includes a lens working together with the optical element describe above, an optical filter such as an anti-reflection filter or a band pass filter, a cover glass, and a diaphragm. However, those are merely examples and objects for the application of the optical element are not limited to those.

Furthermore, it is assumed that the optical element is applied to an imaging apparatus such as a camera.

Although the present invention has been described in detail and by reference to the specific embodiments, it is apparent to one skilled in the art that various modifications or changes can be made without departing the spirit and scope of the present invention.

REFERENCE SIGNS LIST

10: Glass lens
11: First aspherical part
12: Second aspherical part
13: Flange part
14: Convex part
15: Tapered part
16: Side surface part
17: Bottom
21: First mold
22: Second mold
23: Third mold
24: Preform
25: Glass member
26: Air trap (gas trap)
30: Lens unit
32: Lens element
33: Lens barrel

The invention claimed is:

1. An optical element, comprising:
a glass lens having a first optical surface, a second optical surface on an opposite side with respect to the first optical surface, a convex part formed outside an outer periphery of the second optical surface and projecting from a second optical surface side such that the convex part has a tapered part forming an inner wall of the convex part and a side surface part forming an outer wall of the convex part, and a bottom formed between the second optical surface and the tapered part of the convex part,
wherein the second optical surface has one of a convex aspherical shape, a convex spherical shape, a concave aspherical shape and a concave spherical shape, the bottom has a length of 50 μm or more and an angle in a range of 0° to 30° between the bottom and a horizontal axis perpendicular to an optical axis of the glass lens, and the tapered part and the side surface part satisfy that B/A is larger than 0.2, where A is a distance from an end point of the tapered part on an optical axis side to the side surface part in a straight line vertical to the optical axis, and B is a height of the tapered part.

2. The optical element according to claim 1, wherein the tapered part and the side surface part satisfy that B/A is larger than 0.25.

3. The optical element according to claim 1, wherein the tapered part and the side surface part satisfy that B/A is larger than 0.5.

4. The optical element according to claim 1, wherein the tapered part and the side surface part satisfy that B/A is smaller than 10.

5. The optical element according to claim 1, wherein the glass lens has a flange part on an outside of the first optical surface, and the tapered part is formed on the flange part.

6. An optical system, comprising:
the optical element of claim 1.

7. An imaging apparatus, comprising:
the optical element of claim 1.

8. The optical element according to claim 1, wherein the first optical surface has one of a convex aspherical shape, a convex spherical shape, a concave aspherical shape and a concave spherical shape.

9. The optical element according to claim 1, wherein the first optical surface has a convex shape, and the second optical surface has a concave shape.

10. The optical element according to claim 1, wherein the first optical surface has a convex shape, and the second optical surface has a convex shape.

11. The optical element according to claim 1, wherein the glass lens has a horizontal region formed substantially parallel with respect to a plane orthogonal to the optical axis and between the first optical surface and the side surface part.

12. The optical element according to claim 11, wherein the tapered part is formed outside an outer periphery of the first optical surface.

13. The optical element according to claim 12, wherein the horizontal region at least partially overlaps with the bottom when viewed from an optical axis direction.

14. The optical element according to claim 1, wherein the tapered part and the side surface part satisfy that B/A is in a range of 0.2 to 10.

15. The optical element according to claim 1, wherein a glass material of the glass lens has a linear expansion coefficient of $10 \times 10^{-6}/°$ C or less.

16. The optical element according to claim 1, wherein B is 500 μm or less.

17. The optical element according to claim 1, wherein B is 250 μm or less.

18. The optical element according to claim 1, wherein B is 125 μm or less.

19. The optical element according to claim 1, wherein the tapered part and the side surface part satisfy that B/A is in a range of 0.5 to 10.

20. The optical element according to claim 1, wherein the tapered part and the side surface part satisfy that B/A is in a range of 0.5 to 5.

* * * * *